US010710623B1

United States Patent
Stys

(10) Patent No.: US 10,710,623 B1
(45) Date of Patent: Jul. 14, 2020

(54) PROPANE TANK DOLLY

(71) Applicant: Mark Stys, Manchester, NH (US)

(72) Inventor: Mark Stys, Manchester, NH (US)

( * ) Notice: Subject to any disclaimer, the term of this patent is extended or adjusted under 35 U.S.C. 154(b) by 127 days.

(21) Appl. No.: 15/919,346

(22) Filed: Mar. 13, 2018

(51) Int. Cl.
B62B 1/26 (2006.01)

(52) U.S. Cl.
CPC ........ *B62B 1/264* (2013.01); *B62B 2202/022* (2013.01)

(58) Field of Classification Search
CPC ......... B62B 1/264; B62B 1/125; B62B 1/147; B62B 1/18; B62B 1/24; B62B 1/16; B62B 1/00; B62B 2202/022; B62B 2203/60
See application file for complete search history.

(56) References Cited

U.S. PATENT DOCUMENTS

| 1,487,584 | A | * | 3/1924 | McCarthy | B66F 7/246 |
| | | | | | 280/79.4 |
| D104,211 | S | | 4/1937 | Estus | |
| 2,667,397 | A | * | 1/1954 | Hallisey | A61M 15/00 |
| | | | | | 312/249.8 |
| 6,042,130 | A | | 3/2000 | Souza | |
| 6,386,559 | B1 | | 5/2002 | Souza | |
| 6,817,360 | B2 | * | 11/2004 | Hikosaka | A61M 16/0672 |
| | | | | | 128/202.27 |
| 6,932,364 | B2 | * | 8/2005 | Koronowski | A45C 5/14 |
| | | | | | 280/37 |
| 7,325,814 | B2 | | 2/2008 | Sparacino | |
| 8,061,723 | B1 | * | 11/2011 | Carroll | A63B 69/0002 |
| | | | | | 280/47.29 |
| 8,262,106 | B1 | | 9/2012 | Suszynsky | |
| 8,636,291 | B1 | | 1/2014 | Kay | |
| 2007/0063469 | A1 | * | 3/2007 | Blum | B62B 1/264 |
| | | | | | 280/47.26 |
| 2011/0291390 | A1 | * | 12/2011 | Benimeli | A45C 5/146 |
| | | | | | 280/655 |
| 2018/0057341 | A1 | * | 3/2018 | Kincaid | B67D 1/0418 |
| 2018/0274837 | A1 | * | 9/2018 | Christensen | F25D 3/06 |

FOREIGN PATENT DOCUMENTS

WO 2006096379 A 12/2007

* cited by examiner

*Primary Examiner* — Glenn F Myers

(57) ABSTRACT

The propane tank dolly comprises a base platform, a containment wall, a pair of wheels, and a handle. The propane tank dolly may be used to transfer a propane tank from a grill to a vehicle and may also be used to protect both the propane tank and the vehicle while the propane tank is transported to a tank exchange center in the vehicle. The propane tank is placed on the base platform within the containment wall and a lid may be placed onto the top of the containment wall. The handle may be extended from within left and right handle bases to move the propane tank dolly on the pair of wheel. The handle may be collapsed into the left and right handle bases to facilitate placing the propane tank dolly and propane tank into the vehicle.

10 Claims, 4 Drawing Sheets

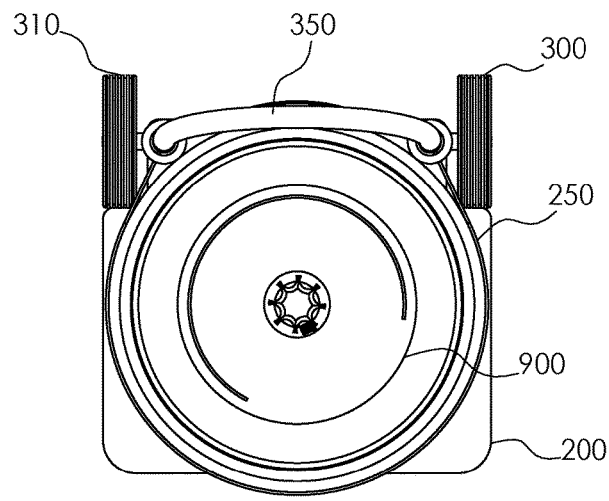
Figure 5
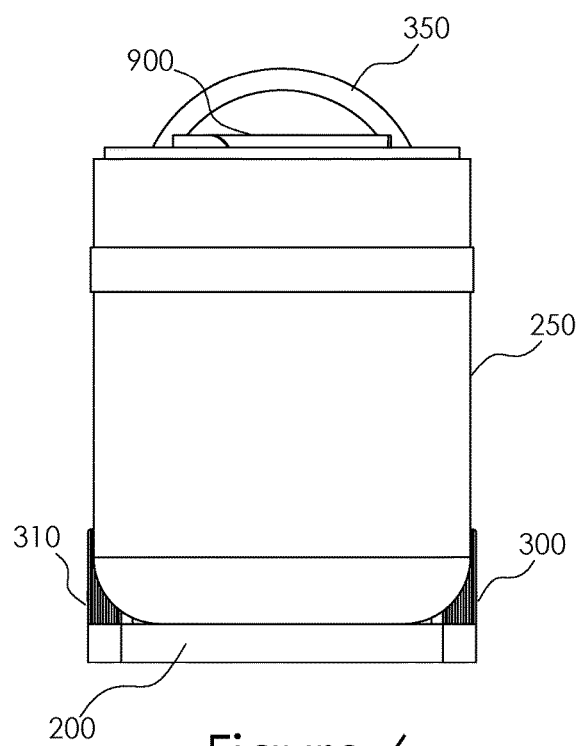 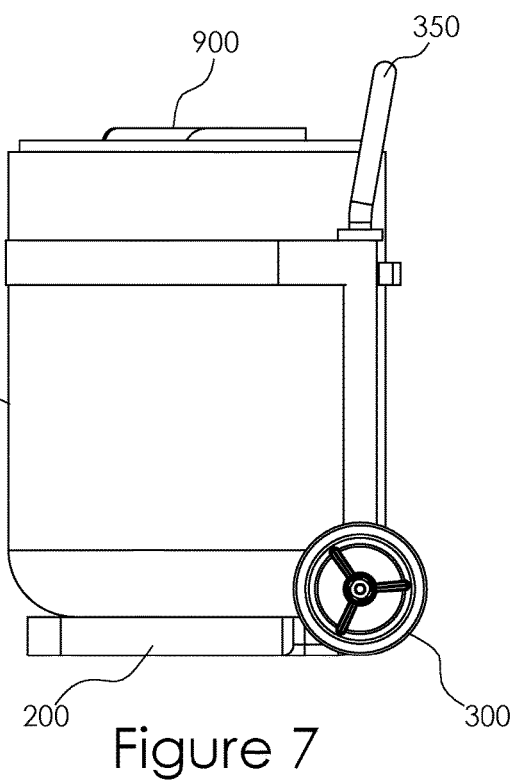
Figure 6    Figure 7

PROPANE TANK DOLLY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of cargo transportation, more specifically, a propane tank dolly.

SUMMARY OF INVENTION

The propane tank dolly comprises a base platform, a containment wall, a pair of wheels, and a handle. The propane tank dolly may be used to transfer a propane tank from a grill to a vehicle and may also be used to protect both the propane tank and the vehicle while the propane tank is transported to a tank exchange center in the vehicle. The propane tank is placed on the base platform within the containment wall and a lid may be placed onto the top of the containment wall. The handle may be extended from within left and right handle bases to move the propane tank dolly on the pair of wheel. The handle may be collapsed into the left and right handle bases to facilitate placing the propane tank dolly and propane tank into the vehicle.

An object of the invention is to provide a dolly for transferring a propane tank.

Another object of the invention is to contain the propane tank within the propane tank dolly and prevent rolling of the tank while the propane tank dolly is transferred by a vehicle.

A further object of the invention is to provide a handle that can be extended and used to move the propane tank dolly or collapsed to facilitate loading the propane tank dolly into the vehicle.

Yet another object of the invention is to provide wheels that reduce friction while the propane tank dolly is moved with the base platform angled and which do not reduce friction that the base platform is level.

These together with additional objects, features and advantages of the propane tank dolly will be readily apparent to those of ordinary skill in the art upon reading the following detailed description of the presently preferred, but nonetheless illustrative, embodiments when taken in conjunction with the accompanying drawings.

In this respect, before explaining the current embodiments of the propane tank dolly in detail, it is to be understood that the propane tank dolly is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the propane tank dolly.

It is therefore important that the claims be regarded as including such equivalent construction insofar as they do not depart from the spirit and scope of the propane tank dolly. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 5 is a top view of an embodiment of the disclosure.

FIG. 6 is a front view of an embodiment of the disclosure.

FIG. 7 is a side of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
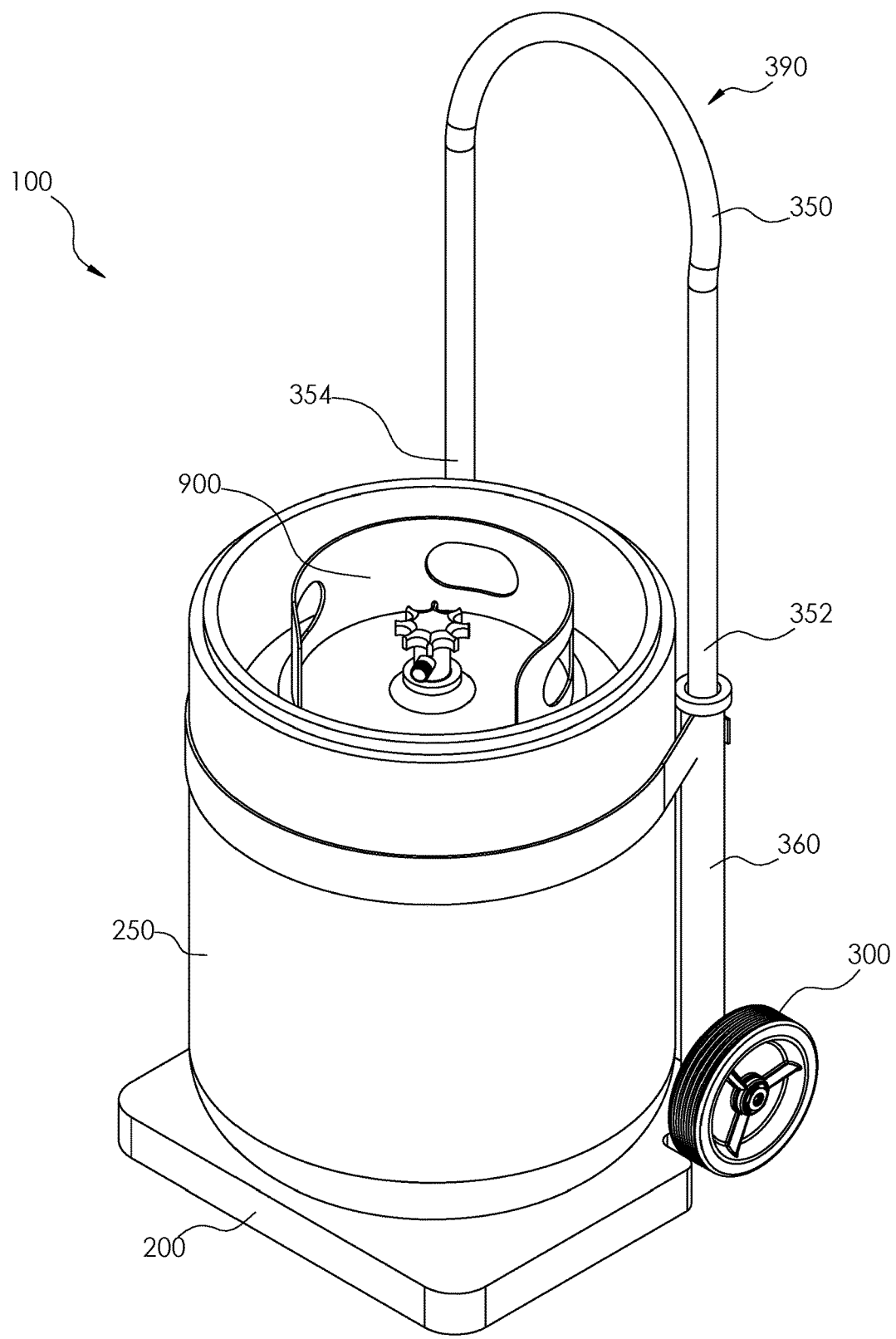
FIG. 1 is a perspective view of an embodiment of the disclosure with the handle in the up position.
Figure 2:
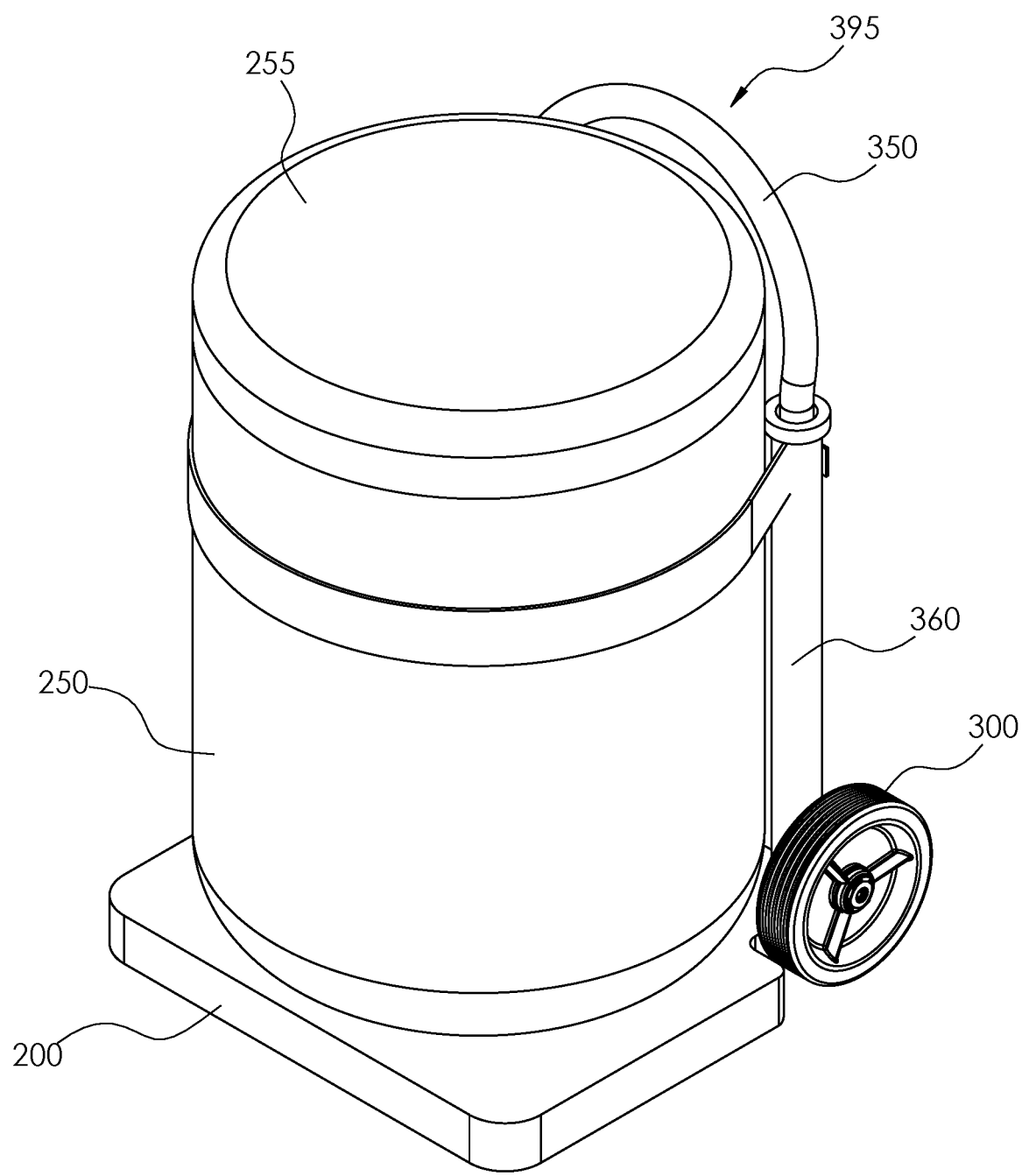
FIG. 2 is a perspective view of an embodiment of the disclosure with the handle in the down position and the lid in place.
Figure 4:
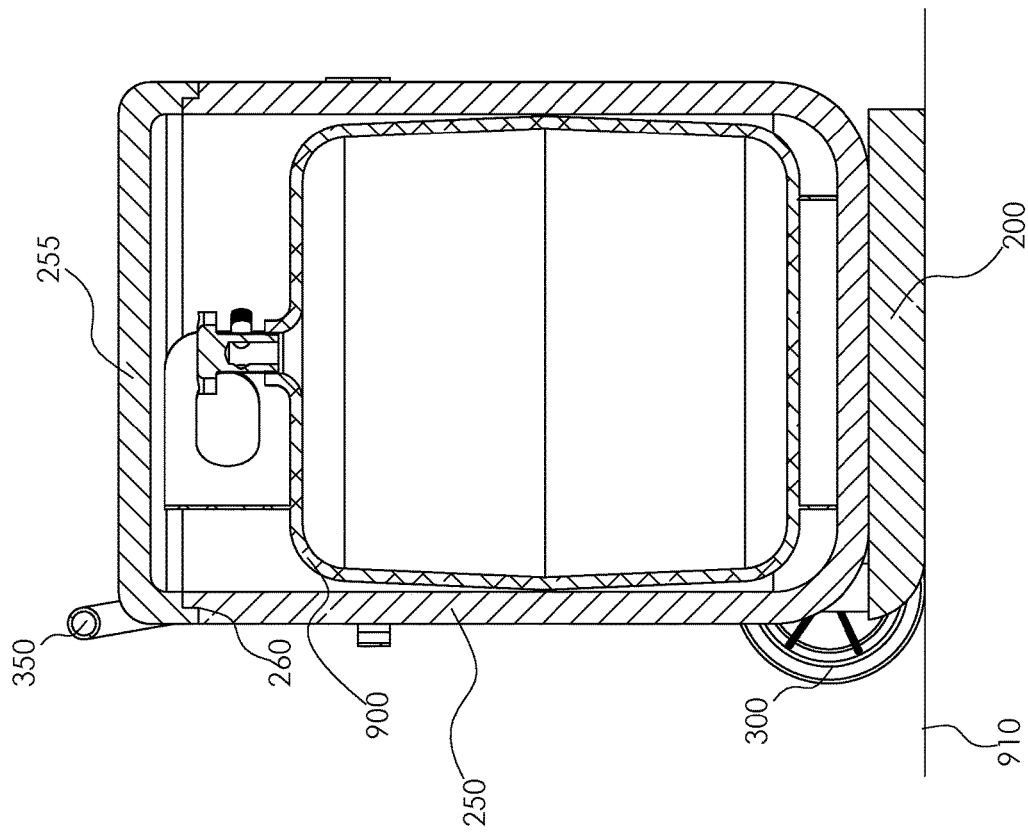
FIG. 4 is a cross-sectional view of an embodiment of the disclosure across 4-4 as shown in FIG. 3.
Figure 3:
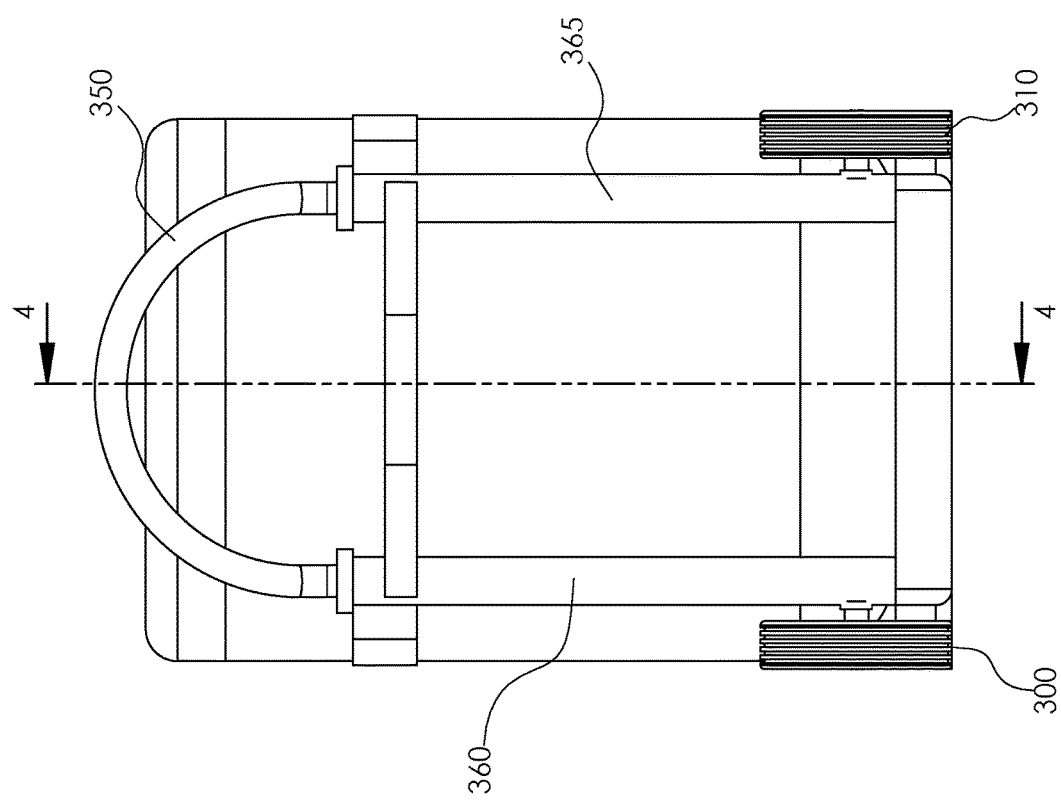
FIG. 3 is a rear view of an embodiment of the disclosure.

Detailed reference will now be made to a first potential embodiment of the disclosure, which is illustrated in FIGS. 1 through 7.

The propane tank dolly 100 (hereinafter invention) comprises a base platform 200, a containment wall 250, a left wheel 300, a right wheel 310, and a handle 350. The invention 100 is a wheeled carrier for a propane tank 900. The invention 100 eases the task of moving the propane tank 900. The invention 100 protects both the propane tank 900 and a vehicle (not illustrated in the figures) that is transporting the propane tank 900. The invention 100 stabilizes the propane tank 900 and prevents the propane tank 900 from rolling while being transported in the vehicle.

Throughout this disclosure, directional references are provided within a gravitational frame of reference where down is the direction that gravity pulls an object and up is the opposite of down. The rear side of the invention 100 is defined to be the side of the invention 100 where the handle 350 is located and the front side is the side that is opposite the rear side. The left side of the invention 100 is the same side as the left side of an observer when the observer is standing on the rear side of the invention 100 and the observer looking towards front side of the invention 100. The right side of the invention 100 is the side that is opposite the left side of the invention 100. Unless otherwise stated, descriptions assume that the invention 100 is resting on a level surface and is not tilted for the purpose of being pulled.

The base platform 200 is a square plate that is horizontally oriented. The propane tank 900 rests on the top of the base platform 200 and is supported by the base platform 200. The bottom of the base platform 200 is placed on a floor, a vehicle cargo area, or other horizontal support surface 910 upon which the invention rests when the invention 100 is stationary. The bottom of the base platform 200 is above the horizontal support surface 910 at a shallow angle while the propane tank 900 is being moved using the invention 100.

The bottom surface of the base platform 200 may be padded to prevent it from scratching or scuffing the horizontal support surface 910. As a non-limiting example, the bottom surface of the base platform 200 may comprise a rubberized lining.

In some embodiments, the upper surface of the base platform 200 may comprise embossing, raised lips, countersinks, modeled features, or other vertical contours to engage with the bottom of the propane tank 900 for the purposes of centering the propane tank 900 and preventing the propane tank 900 from sliding while the propane tank 900 is resting on the upper surface of the base platform 200.

The containment wall 250 may be a vertical structure that surrounds the propane tank 900. The bottom edge of the containment wall 250 may be coupled to the upper surface of the base platform 200. As non-limiting examples, the shape of the containment wall 250 when viewed from above may be circular or square.

The narrowest inside diameter of the containment wall 250 may be greater than or equal to the diameter of the propane tank 900.

The height of the containment wall 250 as measured from the top surface of the base platform 200 to the top of the containment wall 250 may be greater than or equal to the height of the propane tank 900. In some embodiments, the containment wall 250 may be lower than the height of the propane tank 900 and a lid 255 may comprise a downward extension around the edges such that additional height for the propane tank 900 is provided within the underside of the lid 255. Specifically, the distance from the upper surface of the base platform 200 to the underside of the lid 255 may be greater than or equal to the height of the propane tank 900.

The containment wall 250 may coupled to the upper surface of the base platform 200.

The lid 255 may removably couple to the top of the containment wall 250 in a horizontal orientation. The shape of the lid 255 when viewed from above may match the shape of the containment wall 250.

The upper edge of the containment wall 250, the lid 255, or both may comprise a lid interlock 260. The lid interlock 260 may comprise one or more vertical features that prevent the lid 255 from sliding in a horizontal direction when placed on the top of the containment wall 250.

The left wheel 300 may be located at the left, rear of the base platform 200 aligned to rotate in a plane that is parallel to left side of the invention 100. The left wheel 300 may be coupled to the base platform 200 at a position such that the left wheel 300 extends farther towards the rear of the invention 100 than the base platform 200 does. The left wheel 300 may be coupled to the base platform 200 at a position such that the bottom of the left wheel 300 is level with or above the horizontal support surface 910 when the base platform 200 is resting level.

The right wheel 310 may be located at the right, rear of the base platform 200 aligned to rotate in a plane that is parallel to right side of the invention 100. The right wheel 310 may be coupled to the base platform 200 at a position such that the right wheel 310 extends farther towards the rear of the invention 100 than the base platform 200 does. The right wheel 310 may be coupled to the base platform 200 at a position such that the bottom of the right wheel 310 is level with or above the horizontal support surface 910 when the base platform 200 is resting level.

The left wheel 300 and the right wheel 310 may be rotationally coupled to the base platform 200 individually. In some embodiments, the left wheel 300 and the right wheel 310 may be rotationally coupled to opposing ends of an axle (not illustrated in the figures) that runs through the rear of the base platform 200 from left to right.

When the invention 100 is tilted using the handle 350 such that the front edge of the base platform 200 lifts above the horizontal support surface 910, the left wheel 300 and the right wheel 310 contact the horizontal support surface 910 and act as a fulcrum, allowing the base platform 200 to lift off of the horizontal support surface 910 and allowing the left wheel 300 and the right wheel 310 to support all of the weight of the invention 100 and the propane tank 900 within. With the base platform 200 off of the horizontal support surface 910 and with the left wheel 300 and the right wheel 310 in contact with the horizontal support surface 910, the invention 100 rolls on the left wheel 300 and the right wheel 310 with reduced friction. When the invention 100 is level, the left wheel 300 and the right wheel 310 do not reduce friction with the horizontal support surface 910 and therefore the invention 100 resists motion.

The handle 350 may be an armature in the shape of an inverted U. The handle 350 may slide between an up position 390 and a down position 395. When the handle 350 is in the up position 390 the handle 350 may be used to tilt and pull the invention 100. When the handle 350 is in the down position 395 the overall height of the invention 100 is reduced, making it more suitable for loading into the vehicle.

A left end of handle 352 may slidably couple with a left handle base 360. A right end of handle 354 may slidably couple with a right handle base 365.

The left handle base 360 may be a vertical tube coupled at its lower end to the top surface of the base platform 200 at the left rear corner of the base platform 200 and open at its top end. The right handle base 365 may be a vertical tube coupled at its lower end to the top surface of the base platform 200 at the right rear corner of the base platform 200 and open at its top end.

The inside diameter of the left handle base 360 may be substantially the same as the outside diameter of the left end of handle 352 and the inside diameter of the right handle base 365 may be substantially the same as the outside diameter of the right end of handle 354.

The left handle base 360 and the right handle base 365 may be coupled to the containment wall 250 for additional strength. The handle 350 is coupled to the base platform 200 at the top, rear surface of the base platform 200.

In use, an empty propane tank (not illustrated in the figures) may be placed within the containment wall 250, resting on the base platform 200, and the lid 255 may be placed on the top of the containment wall 250. The handle 350 may be moved to the up position 390 and the invention 100 may be pulled to the vehicle. The handle 350 may be moved to the down position 395 and the invention 100 may be loaded into the vehicle and taken to a tank exchange center. The invention 100 may be removed from the vehicle and the handle 350 may be moved to the up position 390. The invention 100 may be pulled to the tank exchange area, the lid 255 may be removed, and the empty propane tank may be lifted from within the containment wall 250. A full propane tank (not illustrated in the figures) may be placed within the containment wall 250 and the lid 255 may be placed on top of the containment wall 250. The invention 100 may be pulled to the vehicle where the handle 350 may be moved to the down position 395 and the invention 100 may be loaded into the vehicle. The vehicle may be driven home where the invention 100 may be removed from the vehicle, the handle 350 may be moved to the up position 390, and the invention 100 may be pulled to a grill. The lid 255 may be removed and the full propane tank may be lifted out of the containment wall 250 and connected to the grill.

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "axle" is a cylindrical shaft that is inserted through the center of an object such that the center axis of the object and the center axis of the axle are aligned and the object can rotate using the axle as an axis of rotation.

As used herein, the words "couple", "couples", "coupled" or "coupling", refer to connecting, either directly or indirectly, and does not necessarily imply a mechanical connection.

As used in this disclosure, a "diameter" of an object is a straight-line segment that passes through the center (or center axis) of an object. The line segment of the diameter is terminated at the perimeter or boundary of the object through which the line segment of the diameter runs.

As used in this disclosure, a "dolly" refers to a mobile platform, generally mounted on casters, that is used to move a load or an object.

As used herein, "front" indicates the side of an object that is closest to a forward direction of travel under normal use of the object or the side or part of an object that normally presents itself to view or that is normally used first. "Rear" or "back' refers to the side that is opposite the front.

As used in this disclosure, a "fulcrum" is a support around which a lever rotates.

As used in this disclosure, a "handle" is an object by which a tool, object, or door is held or manipulated with the hand.

As used in this disclosure, "horizontal" is a directional term that refers to a direction that is perpendicular to the local force of gravity. Unless specifically noted in this disclosure, the horizontal direction is always perpendicular to the vertical direction.

As used herein, "inside diameter" refers to a measurement made on a hollow conduit. Specifically, the inside diameter is the distance from one inside wall to the opposite inside wall. If the conduit is round, then the inside diameter is a true diameter, however the term may also be used in connection with a square conduit in which case the inside diameter is simply the narrowest inside measurement that passes through the center of the conduit.

As used herein, the words "invert", "inverted", or "inversion" refer to an object that has been turned inside out or upside down or to the act of turning an object inside out or upside down.

As used in this disclosure, a "lid" is a removable cover that is placed on a hollow structure to contain the contents within the hollow structure.

As used in this disclosure, "orientation" refers to the positioning and/or angular alignment of a first object relative to a second object or relative to a reference position or reference direction.

As used herein, "outside diameter" refers to a measurement made on an object. Specifically, the outside diameter is the distance from one point on the outside of the object to a point on the opposite side of the object along a line passing through the center of the object. The term outside diameter is frequently used in conjunction with round objects such as hollow conduits in which case the outside diameter is a true diameter, however the term may also be used in connection with a square object in which case the outside diameter is simply the widest outside measurement that passes through the center of the conduit.

As used in this disclosure, a "plate" is a flat, rigid object having at least one dimension that is of uniform thickness and appears thinner than the other dimensions of the object. Plates often have a rectangular or disk like appearance. Plates may be made of any material, but are commonly made of metal.

As used herein, the term "shallow angle" refers to an angle measuring between 0 and 45 degrees.

As used herein, the word "substantially" indicates that two or more attributes are the same except for a margin of error related to variances in materials, manufacturing processes, craftsmanship, installation, environmental conditions, or other factors that may influence the attributes and that the margin of error due to these factors is tolerable.

As used in this disclosure, a "vehicle" is a device that is used for transporting passengers, goods, or equipment.

As used in this disclosure, "vertical" refers to a direction that is parallel to the local force of gravity. Unless specifically noted in this disclosure, the vertical direction is always perpendicular to horizontal.

As used in this disclosure, a "wheel" is a circular object that revolves around an axle or an axis and is fixed below an object to enable it to move easily over the ground.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:
1. A propane tank dolly comprising:
a base platform, a containment wall, a left wheel, a right wheel, and a handle;
wherein the propane tank dolly is a wheeled carrier for a propane tank;
wherein the propane tank dolly protects both the propane tank and a vehicle that is transporting the propane tank;
wherein the propane tank dolly stabilizes the propane tank and prevents the propane tank from rolling while being transported in the vehicle;
wherein the base platform is a square plate that is horizontally oriented;
wherein the propane tank rests on the top of the base platform and is supported by the base platform;
wherein the bottom of the base platform is placed on a horizontal support surface upon which the invention rests when the propane tank dolly is stationary;
wherein the bottom of the base platform is above the horizontal support surface at a shallow angle while the propane tank is being moved using the propane tank dolly;
wherein the bottom surface of the base platform is padded to prevent it from scratching or scuffing the horizontal support surface;
wherein the containment wall is a vertical structure that surrounds the propane tank;
wherein the bottom edge of the containment wall is coupled to the upper surface of the base platform;
wherein the upper edge of the containment wall, a lid, or both comprise a lid interlock;
wherein the lid interlock comprises one or more vertical features that prevent the lid from sliding in a horizontal direction when placed on the top of the containment wall;
wherein the upper surface of the base platform comprises vertical contours to engage with the bottom of the propane tank for the purposes of centering the propane tank and preventing the propane tank from sliding while the propane tank is resting on the upper surface of the base platform;
wherein the narrowest inside diameter of the containment wall is greater than or equal to the diameter of the propane tank;
wherein the containment wall is lower than the height of the propane tank and a lid comprises a downward extension around the edges such that additional height for the propane tank is provided within the underside of the lid;
wherein the distance from the upper surface of the base platform to the underside of the lid is greater than or equal to the height of the propane tank;
wherein the containment wall is coupled to the upper surface of the base platform;
wherein the lid removably couples to the top of the containment wall in a horizontal orientation;
wherein the shape of the lid when viewed from above matches the shape of the containment wall.
2. The propane tank dolly according to claim 1
wherein the left wheel is located at the left, rear of the base platform;
wherein the left wheel is aligned to rotate in a plane that is parallel to left side of the propane tank dolly;
wherein the left wheel is coupled to the base platform at a position such that the left wheel extends farther towards the rear of the propane tank dolly than the base platform does;
wherein the left wheel is coupled to the base platform at a position such that the bottom of the left wheel is level with or above the horizontal support surface when the base platform is resting level.
3. The propane tank dolly according to claim 2
wherein the right wheel is located at the right, rear of the base platform;
wherein the right wheel is aligned to rotate in a plane that is parallel to right side of the propane tank dolly;
wherein the right wheel is coupled to the base platform at a position such that the right wheel extends farther towards the rear of the propane tank dolly than the base platform does;
wherein the right wheel is coupled to the base platform at a position such that the bottom of the right wheel is level with or above the horizontal support surface when the base platform is resting level.
4. The propane tank dolly according to claim 3
wherein the left wheel and the right wheel are rotationally coupled to the base platform individually.
5. The propane tank dolly according to claim 3
wherein the left wheel and the right wheel are rotationally coupled to opposing ends of an axle that runs through the rear of the base platform from left to right.
6. The propane tank dolly according to claim 1
wherein when the propane tank dolly is tilted using the handle such that the front edge of the base platform lifts above the horizontal support surface, the left wheel and the right wheel contact the horizontal support surface and act as a fulcrum, allowing the base platform to lift off of the horizontal support surface and allowing the left wheel and the right wheel to support all of the weight of the propane tank dolly and the propane tank within;
wherein with the base platform off of the horizontal support surface and with the left wheel and the right wheel in contact with the horizontal support surface, the propane tank dolly rolls on the left wheel and the right wheel with reduced friction;
wherein when the propane tank dolly is level, the left wheel and the right wheel do not reduce friction with the horizontal support surface and therefore the propane tank dolly resists motion.
7. The propane tank dolly according to claim 6
wherein the handle is an armature in the shape of an inverted U;
wherein the handle slides between an up position and a down position;
wherein when the handle is in the up position the handle is used to tilt and pull the propane tank dolly;
wherein when the handle is in the down position the overall height of the propane tank dolly is reduced, making it more suitable for loading into the vehicle.
8. The propane tank dolly according to claim 7
wherein a left end of handle slidably couples with a left handle base;
wherein a right end of handle slidably couples with a right handle base;
wherein the left handle base is a vertical tube coupled at its lower end to the top surface of the base platform at the left rear corner of the base platform and open at its top end;
wherein the right handle base is a vertical tube coupled at its lower end to the top surface of the base platform at the right rear corner of the base platform and open at its top end.

9. The propane tank dolly according to claim 8 wherein the inside diameter of the left handle base is substantially the same as the outside diameter of the left end of handle and the inside diameter of the right handle base is substantially the same as the outside diameter of the right end of handle.

10. The propane tank dolly according to claim 9 wherein the left handle base and the right handle base are coupled to the containment wall for additional strength; wherein the handle is coupled to the base platform at the top, rear surface of the base platform.

\* \* \* \* \*